(12) United States Patent
Li et al.

(10) Patent No.: US 9,148,848 B2
(45) Date of Patent: Sep. 29, 2015

(54) METHOD AND SYSTEM FOR ACCESSING NETWORK

(71) Applicant: Huawei Technologies Co., Ltd., Shenzhen, Guangdong (CN)

(72) Inventors: Yue Li, Shenzhen (CN); Jie Ma, Shenzhen (CN); Zhenxing Hu, Shenzhen (CN); Miao Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 374 days.

(21) Appl. No.: 13/765,416

(22) Filed: Feb. 12, 2013

(65) Prior Publication Data

US 2013/0155894 A1   Jun. 20, 2013

Related U.S. Application Data

(63) Continuation of application No. PCT/CN2011/074748, filed on May 27, 2011.

(30) Foreign Application Priority Data

Aug. 12, 2010 (CN) .......................... 2010 1 0251781

(51) Int. Cl.
*H04W 74/00* (2009.01)
*H04W 48/18* (2009.01)
(Continued)

(52) U.S. Cl.
CPC .............. *H04W 48/18* (2013.01); *H04W 4/005* (2013.01); *H04W 74/0833* (2013.01)

(58) Field of Classification Search
None
See application file for complete search history.

(56) References Cited

U.S. PATENT DOCUMENTS

2011/0128911 A1* 6/2011 Shaheen ........................ 370/328
2011/0274040 A1* 11/2011 Pani et al. ..................... 370/328
(Continued)

FOREIGN PATENT DOCUMENTS

| CN | 1333987 A | 1/2002 |
| CN | 1917671 A | 2/2007 |
| CN | 101222756 A | 7/2008 |

(Continued)

OTHER PUBLICATIONS

Written Opinion of the International Searching Authority in corresponding PCT Patent Application No. PCT/CN2011/074748 (Sep. 8, 2011).

(Continued)

*Primary Examiner* — Robert C Scheibel
(74) *Attorney, Agent, or Firm* — Leydig, Voit & Mayer, Ltd.

(57) ABSTRACT

A method and system for accessing a network are disclosed in the present invention. The method includes that: terminals in a same group execute random number synchronization; when an arbitrary first terminal in the group initiates network access, terminals in the group except the first terminal monitor the access of the first terminal according to the synchronized random number; after monitoring that the first terminal accesses network successfully, the terminals in the group except the first terminal initiate network access by using Radio Resource Control (RRC) connection uplink resources which are allocated to the group by the network. The technical solution of the present invention can reduce the signaling overhead for establishing signaling connection and data bearing.

22 Claims, 9 Drawing Sheets

(51) Int. Cl.
*H04W 74/08* (2009.01)
*H04W 4/00* (2009.01)

(56) References Cited

U.S. PATENT DOCUMENTS

2011/0274070 A1* 11/2011 Xia et al. .................. 370/329
2012/0033613 A1* 2/2012 Lin et al. .................. 370/328

FOREIGN PATENT DOCUMENTS

| CN | 101365220 A | 2/2009 |
| CN | 101772171 A | 7/2010 |

OTHER PUBLICATIONS

International Search Report in corresponding PCT Patent Application No. PCT/CN2011/074748 (Sep. 8, 2011).

"3GPP TS 25.321—$3^{rd}$ Generation Partnership Project; Technical Specification Group Radio Access Network; Medium Access Control (MAC) protocol specification (Release 9)," Version 9.3.0, $3^{rd}$ Generation Partnership Project, Valbonne, France (Jun. 2010).

A J 3GPP TS 25.33—$3^{rd}$ Generation Partnership Project; Technical Specification Group Radio Access Network; Radio Resource Control (RRC); Protocol specification (Release10), Version 10.0.0, $3^{rd}$ Generation Partnership Project, Valbonne, France (Jun. 2010).

"3GPP TSG SA WG2 Meeting #78—MCT Group Subscription," TD S2-101083, Agenda Item 9.7, $3^{rd}$ Generation Partnership Project, Valbonne, France (Feb. 2010).

"3GPP TSG SA WG2 Meeting #S2-79E—Resource Sharing Solution for MTC Groups," Td S2-103106, Agenda Item 2.1, $3^{rd}$ Generation Partnership Project, Valbonne, France (May 2010).

* cited by examiner

METHOD AND SYSTEM FOR ACCESSING NETWORK

CROSS-REFERENCE TO RELATED APPLICATIONS

This application is a continuation of International Patent Application No. PCT/CN2011/074748, filed on May 27, 2011, which claims priority to Chinese Patent Application No. 201010251781.3, filed on Aug. 12, 2010, both of which are hereby incorporated herein by reference in their entireties.

FIELD OF THE INVENTION

The present invention relates to the field of communication techniques, and more particular, to a method and system for accessing a network.

BACKGROUND OF THE INVENTION

In most existing mobile communication systems, for example, various wireless communication systems such as Global System for Mobile Communications (GSM), Wideband Code Division Multiple Access Wireless (WCDMA), Code Division Multiple Addressing (CDMA), Worldwide Interoperability for Microwave Access (WiMAX), CDMA2000, TD-SCDMA, Long Term Evolution (LTE) and WLAN/WiFi, a random access procedure has to be performed first when a terminal initiates an uplink service. At the point, access collisions may occur and cause the access failed due to the possibility that a plurality of terminals may initiate respective random access procedures concurrently with the same access occasion and the same access code selected. Access failure may cause increasing access delay and a lower successful access rate. In current mobile communication systems, a conventional way to ensure the access delay and the success rate is to provide more access resources so as to lower the collision probability.

With the development of mobile communication techniques, machine to machine (M2M) communication has been proposed. M2M and IOT (Internet of Things) become a hotspot that operators concern, and various applications have been developed rapidly based on M2M and IOT. Different from prior H2H (human to human) communication, M2M communication requires an even larger number of terminals, perhaps up to 10 times of that for H2H or even more, for example, a magnitude order of 50 billion.

IOT refers to applications of M2M in WANs, especially in mobile operators' networks, that is, wireless data transmission services that take the mobile network operators' wireless networks as a platform and provide industry machine-to-machine services in various transmission manners (such as, CDMA, GSM, etc) through special industry terminals.

M2M/IOT has extensive fields of applications, and is applicable to intelligent transportation, telemedicine, monitoring, smart grids, environmental monitoring, intelligent home and other situations.

MTC (Machine Type communication) communication refers to network communication that takes place in one network element (NE) or between a plurality of NEs without human interventions (i.e., an M2M application), such as, traffic control and management, factory monitoring, remote meter reading and the like. In M2M applications, a plurality of M2ME (Machine to Machine Equipment) having the same M2M application form an integral unit also called as a group.

MTC device identity can uniquely identify a M2M terminal, which may employ IMSI (International Mobile Subscriber Identity), MSISDN (Mobile Station International ISDN Number), IP address, IMPU (IP Multimedia Public Identity), IMPI (IP Multimedia Private Identity) and the like.

Due to limited wireless communication resources, time-frequency resources are allocated only when a user wants to communicate. When a user initiates a communication, first of all, a random access procedure has to be performed, followed by connection establishment and data transmission according to RRC (Radio resource control), and finally, allocated resources are released after the communication. Taking LTE as an example, random access resources comprise two parts: slot and frequency for initiating a random access; and preamble to be used. In existing cellular wireless communication systems, random access mainly takes two forms: contention based and non-contention based random accesses.

Non-contention based random access refers to notifying UE (User Equipment) by eNB (Enhanced NodeB) to use its particular access resources. Because access resources have to be allocated by eNB, it may result in a larger system overhead. So, it is only used in situations with higher delay requirements, such as handover and dropped connection.

In the contention based random access, eNB may broadcast information about access resources by which random access may be initiated in a cell, and then UE may randomly select an allowed preamble, and randomly select a random access frequency resource at a next time that allows random access, and then initiate a random access at the selected time-frequency position. Because each UE randomly selects random access resources in an independent manner, when the same random access resources are selected by a plurality of UEs, conflicts may occur. According to a solution for resolving the conflict in the existing protocols, only one of the plurality of UEs in conflict may have successful access, and other UEs need to initiate their access attempts again after a back-off period, and withdraw if conflicts occur again, until access succeeds or a maximum attempt number is reached. The occurrence of conflict may delay UE access and put an extra burden on the network and UEs.

The number of terminals engaged in M2M communications is very huge, while each terminal may have a very small interaction traffic amount and the interaction may be a burst interaction. A M2M terminal (also called as MTC terminal) may realize a relatively simple function and only need to communicate some particular information; some M2M terminals may have relatively constant positions, or may be seldom moved; M2M terminals may have consistent behaviors in a special application, such as intelligent meter reading.

In M2M services, because there are a large number of MTC terminals, network resource contention occurs if the large number of MTC terminals access the network, putting a further burden on the network. It is worse especially in some applications such as intelligent meter reading.

Taking intelligent transportation as an example, a typical intelligent transportation system comprises a GPS (Globe Positioning System)/GLONASS (Global Navigation Satellite System of Russia) satellite positioning system, a vehicle mounted mobile terminal, a wireless network, and a ITS (Intelligent Transport System) control center. The vehicle mounted terminal receives ranging information from a navigation satellite network through the GPS module and transmits longitude, latitude, speed, time and other information of the vehicle to a microcontroller; vehicle status information is collected by a video equipment; the microcontroller communicates interactive information in two-way with the ITS control center through a GPRS module so as to realize vehicle monitoring and other functions.

As another example about a smart grid, the smart grid requires all intelligent grid terminals to periodically report their data, for example, in the electronic meter reading service, all intelligent grid terminals upload their data to a particular server at a certain time. For example, in many countries, smart grids instruct a large number of MTC terminals to frequently report their meter reading data, which has only a small amount of data, with a period of 5 minutes.

In existing networks, for example, such as LET, the random access procedure is performed for individual UEs. A contention based random access procedure can be described as follows.

A UE randomly and equiprobably selects access resources within a range that is permitted, and sends a selected preamble at the selected resource position.

101. The UE monitors a random access response (RAR) returned from a eNB, where the RAR comprises random access resource information that has been received by the eNB, timing advance (TA) information, UL resource grant (UL GRANT) for a next stage, and temporary cell radio network temporary identity (T-CRNTI).

102. If the UE detects a RAR for its own selected random access resources, step 103 is executed; otherwise, a preamble is re-initiated.

103. The UE performs UL synchronization according to TA, and sends a request message, including the unique identity of the UE, at a resource position indicated by the UL GRANT, and it can also performs HARQ (Hybrid Automatic repeat reQuest).

104. When the eNB correctly receives the request message sent from the UE at 103, it returns an correct receiving message with the unique identity of the UE; then, only the UE that receives the correct receiving message correctly and has a matched identity returns an ACK, while other UEs withdraw and attempt their access later, by which the problem of conflict is solved.

However, when too many users initiate access attempts simultaneously, multiple UEs may select the same random access resource, causing significantly increasing of average access delay for users. Meanwhile, a large amount of re-initiated access attempts may cause large overheads on UEs and eNB.

Therefore, when a large number of terminals transmit their data, it may cause a significant increase in average access delay for users and a large signaling overhead, which may affect normal communications.

SUMMARY OF THE INVENTION

A network access method and system are provided in embodiments of the present invention, which is capable of reducing user access delay and lowering the signaling overhead for signaling connection and data bearer establishment.

A network access method is disclosed according to an aspect of this invention, comprising: performing random number synchronization by terminals belonging to a same group; when an arbitrary first terminal in the group initiates network access, other terminals than the first terminal in the group monitoring the access of the first terminal according to the synchronized random number; after it is detected that the first terminal accesses the network successfully, other terminals than the first terminal in the group initiating network access by using of RRC (Radio resource control) connection UL resources allocated to the group by the network.

A network access method is disclosed in another aspect of this invention, comprising: grouping terminals by a network, wherein terminals belonging to a same group have a synchronized random number; the network receiving network access initiated by an arbitrary first terminal in a group; after the first terminal accesses successfully the network, the network allocating RRC connection UL resources to terminals in the group that the first terminal belongs to; the network receiving network access initiated by other terminals except the first terminal in the group using the RRC connection UL resources allocated to the group by the network after monitoring that the first terminal accesses network successfully.

A terminal is disclosed according to another aspect of this invention, comprising a synchronization configured to perform random number synchronization with terminals belonging to the same group; a monitoring unit configured to, when an arbitrary first terminal in the group initiates network access, monitor the access of the first terminal according to the synchronized random number; an access unit configured to, after monitoring that the first terminal accesses network successfully, access the network using RRC connection UL resources allocated to the group by the network.

A communication network element (NE) is disclosed according to another aspect of this invention, comprising a grouping configured to group terminals, wherein terminals belonging to the same group have the same synchronized random number; a receiving unit configured to receive network access initiated by an arbitrary first terminal in a group; an allocation unit configured to, after the first terminal accesses successfully the network, allocate RRC connection UL resources to the group the first terminal belongs to; an access configured to receive network access initiated by other terminals except the first terminal in the group using the RRC connection UL resources allocated to the group after monitoring that the first terminal accesses network successfully.

According to the technical solutions of this invention, the signaling overhead for signaling connection and data bearer establishment can be reduced in connection establishment between terminals and a network.

BRIEF DESCRIPTION OF THE DRAWINGS

For a more explicit description of the technical solutions of embodiments of the invention, a brief introduction of accompanying drawings to be used in the description of these embodiments will be given below. Obviously, accompanying drawings described below are merely some embodiments of this invention; for those skilled in the art, other accompanying drawings can be derived from these ones without any creative efforts.

DETAILED DESCRIPTION OF THE EMBODIMENTS

In the following description, for illustration but not as limitation, particular details such as specific system structures, interfaces, techniques are provided for a thorough understanding of this invention. However, those skilled in the art may appreciate that this invention can be realized in other embodiments without these particular details. In other cases, a detailed description of well known devices, circuits and methods is omitted for preventing obscuring this invention with unnecessary details.

The technical solutions of the present invention can be applied to various communication systems, for example, GSM, CDMA (Code Division Multiple Access), TD-SCDMA, CDMA2000, WIMAX, WCDMA (Wideband Code Division Multiple Access Wireless), GPRS (General Packet Radio Service), and LTE (Long Term Evolution).

Terminals comprise mobile terminals and fixed terminals or MTC terminals or the like.

MTC terminals refer to terminals employing M2M communication, and may be terminals used in intelligent transportation, telemedicine, monitoring, smart grids, environment detecting, intelligent home and other scenarios.

Figure 1:
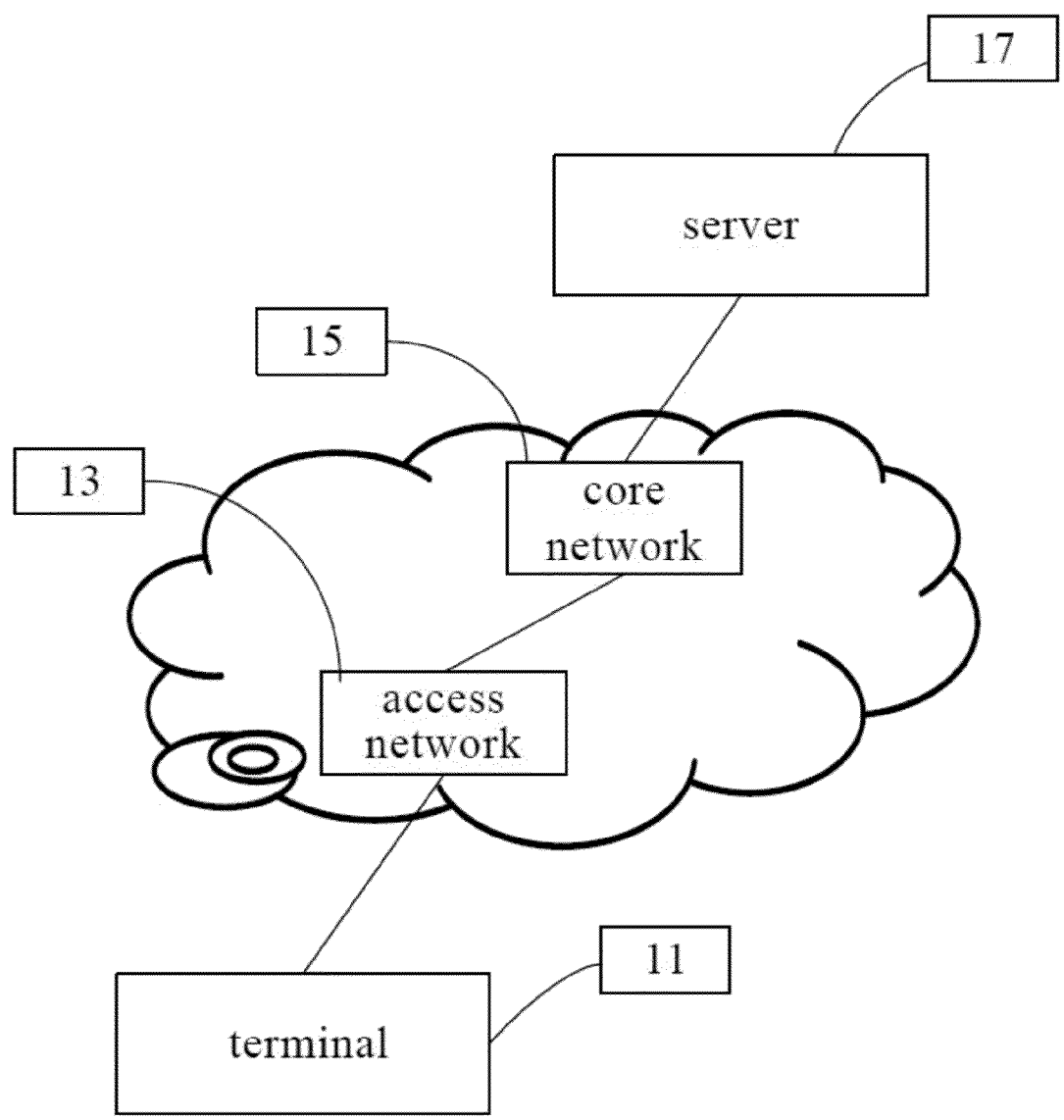
FIG. 1 is a schematic structure diagram of a communication system according to an embodiment of the invention.

Referring to FIG. 1, there is shown a schematic structure diagram of a communication system according to an embodiment of the present invention. The communication system mainly comprises an access network 13, a core network 15, and a server 17.

In the communication system, the access network 13 and the core network 15 are connected with each other through a wired or wireless communication connection, for example, an optical fiber connection. The server 17 may be one or more servers, and the server 17 is connected to the core network 15 through a wired or wireless communication connection, for example, an optical fiber connection. The access network 13 may connect one or more terminals 11 through wired or wireless communication connections.

The server 17 may be a MTC server or a server of other types. The terminals 11 may be mobile phones, fixed-line telephones, computers, MTC terminals, and any other terminals that can be used for communication. The present invention does not have limitation thereof. The access network 13 and the core network 15 may be an access network and a core network of WCDMA, GSN, CDMA, LTE or any other communication network type, respectively. This invention does not have limitation thereof.

The type of a communication system refers to the access technique used by the communication system.

Figure 2:
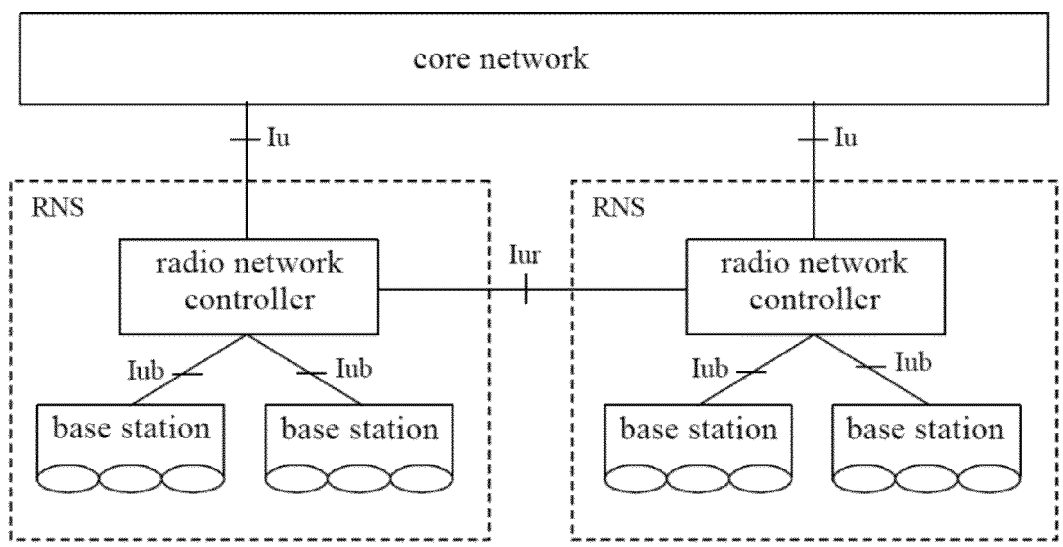
FIG. 2 is a schematic structure diagram of a UMTS system according to another embodiment of the invention.

For example, when the access network 13 and the core network 15 are an access network and a core network of a WCDMA system, respectively, they may have a network structure shown in FIG. 2, a schematic structure diagram of UMTS according to another embodiment of this invention. UMTS (Universal Mobile Telecommunication System) is a 3G mobile communication system employing WCDMA air interface techniques and has a structure similar to the 2th generation mobile communication system. The UMTS system is generally referred to as a WCDMA communication system.

The UMTS system comprises a UTRAN (Universal Terrestrial Radio Access Network), a CN and UEs (User Equipments).

As shown in FIG. 2, the UTRAN, as a terrestrial radio access network, may comprise one or more radio network subsystems (RNS). A RNS comprises a radio network controller (RNC) and one or more base stations (NodeB). A RNC interfaces with the CN through an Iu interface, and a NodeB is connected to a RNC through an Iub interface. Within the UTRAN, RNCs are interconnected through Iur interfaces, and the Iur may be a direct physical connection between RNCs or a transmission network connection. The RNC is configured to allocate and control radio resources of a NodeB connected or associated thereto. The NodeB is used for data stream conversion between an Iub interface and a Uu interface, and is engaged in some radio resource management as well.

A NodeB is a base station (radio transceiver) in the WCDMA system, connected to a RNC through an Iub interface, and is primarily used for realizing physical layer protocol processing of a Uu interface.

A RNC is a radio network controller for controlling radio resources of a UTRAN. The RNC is primarily used to realize connection establishment, disconnection, handover, macro diversity combining, radio resource management and control, etc.

Figure 3:
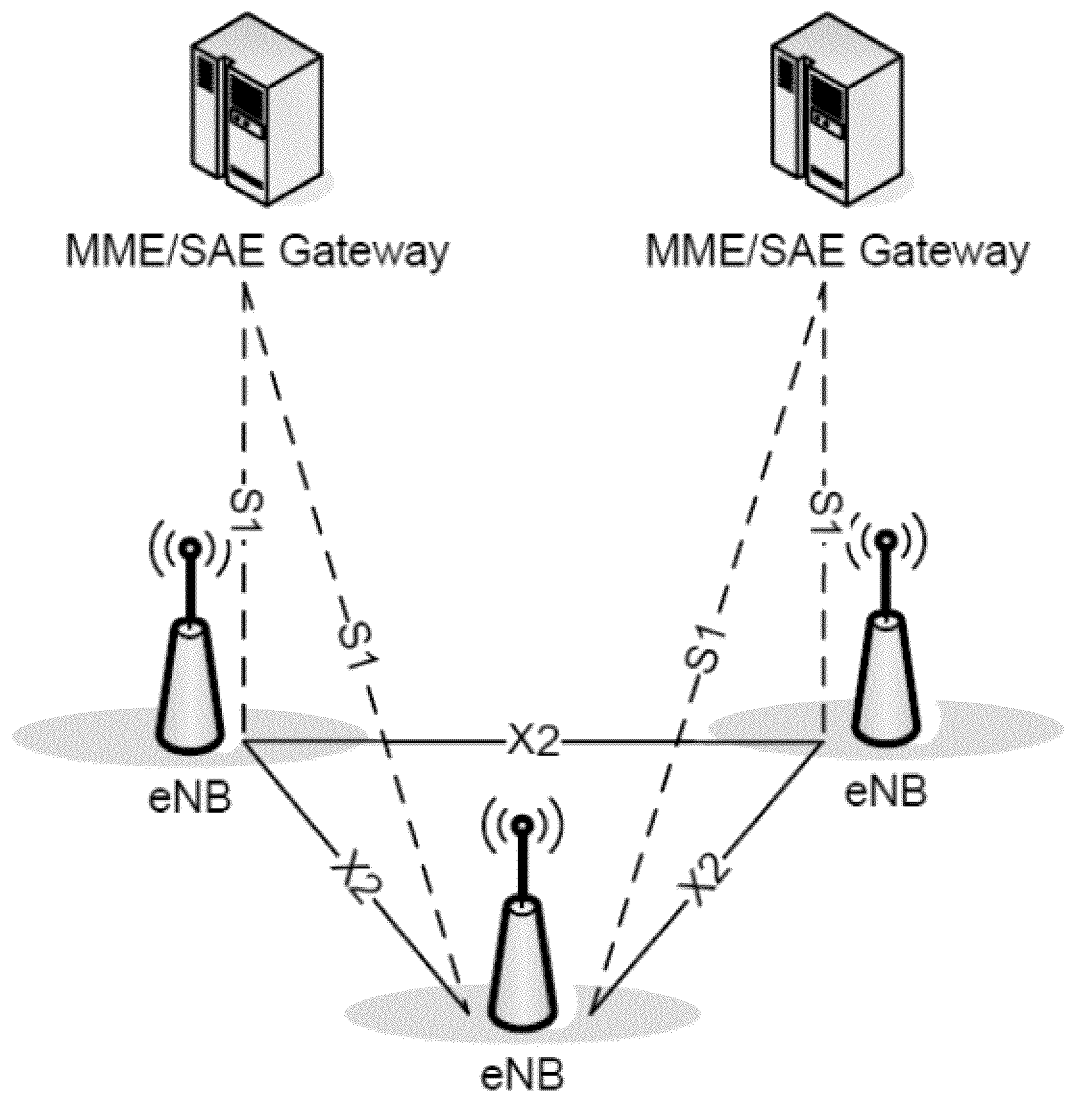
FIG. 3 is a schematic diagram of a network structure of LTE E-UTRAN.

For another example, when the access network 13 and the core network 15 are an access network and a core network of a LTE system, respectively, they may have a network structure as shown in FIG. 3, a schematic structure diagram of a E-UTRAN (Evolved-Universal Terrestrial Radio Access Network) in a LTE network, comprising MMEs (Mobility Management Entities)/severing SAE GWs and eNBs.

In the network structure of FIG. 3, an MME is connected to an eNB through an S1-MME interface, a severing SAE GW is connected to an eNB through an S1-U interface, and two eNBs are connected through an X2 interface.

An access network mainly comprises two parts: eNodeBs (eNBs) and MME/SAE GWs. The MME/SAE GW is a boundary node, and can be considered as part of the CN, in which case, the AN is mainly formed by eNBs. In addition to functions of the original NodeB, the eNB may further realize most of functions of the original RNC, including physical layer functions, MAC layer functions, RRC, scheduling, access control, bearer control, access mobility management, etc. The eNBs may be connected with each other in a mesh manner.

Although only the WCDMA and LTE communication systems are illustrated above as examples, the present invention is also applicable in communication networks of other types. The present invention does not have limitation thereof.

In connection with FIG. 1 showing the structure diagram of the communication system, the working procedure of the communication system may be as follows.

The network is configured to: divide a plurality of terminals (for example, at least two terminals) into one or more groups, where terminals belonging to a same group have a synchronized random number; after a successful network access of a first terminal, allocate RRC connection UL resources for terminals in a group the first terminal belongs to; and then receive network accesses that are initiated by other terminals except the first terminal in the group using the RRC connection UL resources allocated to the group by the network after monitoring that the first terminal accesses network successfully.

For example, in a network system employing various access techniques, an entity, which is configured to divide a plurality of terminals (for example, at least two terminals) into one or more groups and receive network access initiated by an arbitrary first terminal in a group; and receive network accesses initiated by other terminals except the first terminal in the group using the synchronized random number after monitoring that the first terminal accesses network successfully, is realized by one or more communication NEs, such as a single communication NE or different communication NEs, or some functions are realized on a communication NE, and other functions are realized on another communication NE. The present invention does not have limitation thereof. For example, the communication network element may be a device in the AN (Access Network), a device in the CN (Core Network), or a separately provided device. For example, the communication network element may be a NodeB or RNC in a AN of a WCDMA network. Alternatively, the communication network element may be an eNodeB/MME/access gateway of a LTE system. Alternatively, the communication network element may be a BTS (Base Transceiver Station) or BSC (Base Station controller) in a GSM/CDMS system.

For the convenience of description, however, embodiments will be described below with the LTE system as an example, which are also applicable to other communication systems.

Figure 4:
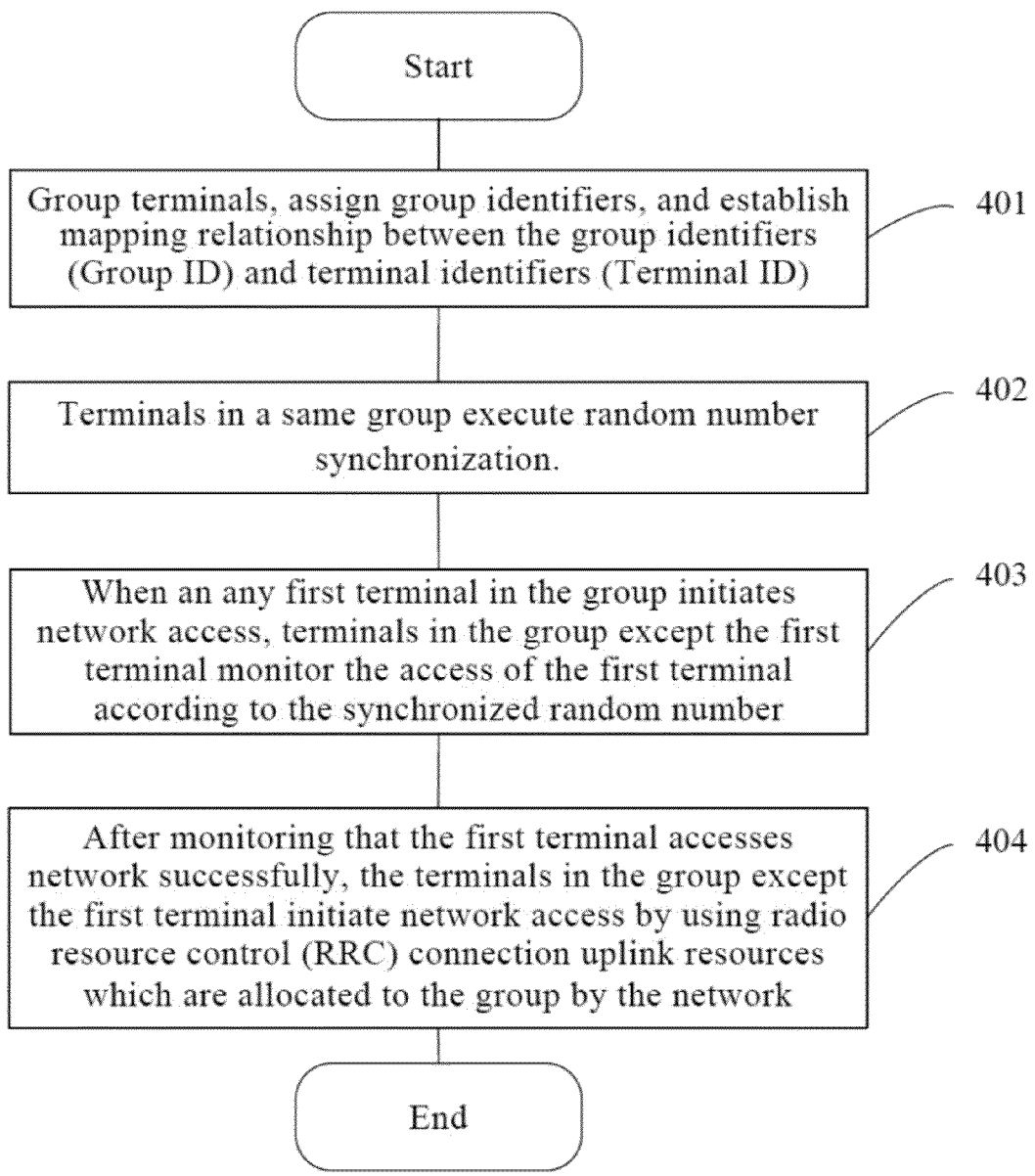
FIG. 4 is a schematic flowchart of a network access method according to another embodiment of the invention.

Referring to FIG. 4, there is shown a schematic flowchart of a network access method according to another embodiment of the present invention.

401. Grouping a plurality of terminals, assigning group IDs, and establishing a mapping relationship between group IDs and terminal IDs.

A communication network element divides a plurality of (for example, at least two) terminals into one or more groups, assigns group IDs and establishes a mapping relationship between group IDs and terminal IDs. For example, a mapping table of group IDs and terminal IDs may be established. The communication network element may be a device in the AN, or a device in the CN, or a separately provided device. For example, the communication network element may be a NodeB or RNC in a AN of a WCDMA network. Alternatively, the communication network element may be an eNodeB/MME/access gateway of a LTE system. Also, the communication network element may be a BTS (Base Transceiver Station) or BSC (Base Station controller) in a GSM/CDMS system.

The group ID may be a group-CRNTI or a group ID number, or may be a self-defined identifier. The terminal ID may be IMSI, MSISDN, IP address, IMPU, IMPI and any other symbol used to uniquely identify a terminal, or may be a self-defined identifier.

The communication network element may group a plurality of terminals and establish a mapping relationship between the group IDs and the terminal IDs in various manners.

For example, in initial network configuration, the communication network element may be provided with at least one group ID, assign a same group ID to all terminals in a same cell, and establish a mapping relationship between group IDs and terminal IDs. For example, the communication network element assigns group IDs in the ascending order of the group IDs and establishes the mapping relationship between group IDs and terminal IDs, and vice versa.

In another embodiment of the invention, terminals in a same cell can be divided into a plurality of groups, for example, different groups according to service types, with different group IDs assigned. For example, terminals for a meter reading service in a smart grid belong to a same group, and terminals for a monitoring service in a transportation system belong to another group. A cell can be provided with one or more group IDs. For example, all terminals in the cell can be assigned with different group IDs according to different types of reporting services those terminals perform. For example, smart grid terminals in the cell correspond to a first group ID, and transportation system terminals in the cell correspond to a second group ID, and the like.

In another embodiment of the invention, before assigning a group ID, the communication network element may further determine according to a terminal ID whether or not there is stored information about the mapping relationship between the terminal ID and its corresponding group ID; if the mapping relationship between the terminal ID and its corresponding group ID is not stored, a group the terminal belongs to may be determined according to the terminal ID, a group ID may be assigned to the terminal and a mapping relationship may be established between the group ID and the terminal ID; if there is a stored mapping relationship between the terminal ID and its corresponding group ID, it does not need to establish a mapping relationship between the group ID and the terminal ID, and the group ID can be directly used in a subsequent process.

In another embodiment of the invention, when it is determined according to a terminal ID that there is not a stored mapping relationship between the terminal ID and its corresponding group ID, and it is determined that there is not an available group ID, the network may be provided with an additional group ID and establish a mapping relationship between the newly provided group ID and the terminal ID.

For example, the group ID can be provided by a server. The communication network element, for example the AN, such as an eNodeB/MME/access gateway of the AN, receives group information including a group ID sent from the server (such as a MTC server). The group ID is an identifier of a group of terminals.

Also, the communication network element receives the report service type of a terminal, searches for a corresponding group ID and then assigns the group ID to the terminal, and establishes a mapping relationship between the group ID and the terminal ID.

Also, a group ID is reported by a terminal, and the communication network element establishes a mapping relationship between the group ID and the terminal ID after receiving the group ID reported by the terminal.

For example, in a terminal registration process, the CN identifies a group the terminal belongs to, for example, according to the access resource or the report service type of the terminal, and then notifies the AN to assign a group ID for the terminal and establishes a mapping relationship between the group ID and the terminal ID.

In another embodiment of the invention, the communication network element, for example, the AN, such as a eNodeB/MME/access gateway of the AN, receives a group ID sent from a terminal, and queries whether there is stored information about a mapping relationship between the group ID and the terminal ID that corresponds to the group ID; if there is not a mapping relationship between the terminal ID and the group ID, a mapping relationship between the group ID and the terminal ID may be established; if there is a stored mapping relationship between the terminal ID and the group ID that corresponds to the group ID, no group ID will be further assigned and the existing group ID is directly used in a subsequent process.

402. Performing random number synchronization for terminals in a same group.

For example, terminals of each group receive group information sent from the network through a broadcast transmission, where the group information may comprise terminal IDs of all terminals in the group; each terminal calculates a group ID of the group it belongs to according to the terminal IDs of all terminals belonging to the group.

In another embodiment of the invention, terminals of each group receive group information sent from the network through a broadcast transmission, where the group information may comprise a group ID of the group, or the group information may comprise a group ID of the group and terminal IDs of all terminals in the group.

In still another embodiment of the invention, each terminal has a group ID of a group it belongs to provided previously.

Terminals in a same group select a same pseudo random number generator according to the group ID and generate a same pseudo random number seed according to the group ID; a same DL slot position may be selected as an input reference time point; a random number may be determined according to the pseudo random number seed and the input reference time point. Because they have the same pseudo random number seed and the same input reference time point, the random numbers are the same also, thereby realizing random number synchronization.

403. When an arbitrary first terminal in the group initiates network access, monitoring, by other terminals except the first terminal in the group, the access of the first terminal according to the synchronized random number.

The first terminal may be determined according to the pseudo random number generator, or the first terminal may be specified by the network, or the first terminal may be determined according to a predetermined setting.

The first terminal may send a preamble to the network; after receiving a random access response (RAR) sent from the network, the first terminal sends RRC connection request information, a location update request or a schedule request on allocated RRC connection UL resources, where the RRC connection request information, the location update request or the schedule request carries the terminal ID of the first terminal, the group ID of the group the first terminal belongs to or the synchronized random number; the first terminal receives an ACK message sent from the network, which carries the terminal ID of the first terminal, the group ID of the group the first terminal belongs to or the synchronized random number; the first terminal sends a RRC connection established message to the network.

Other terminals except the first terminal in the group calculate random access resources to be used according to the synchronized random number; the random access resources comprise a random access radio network temporary identifier (RA-RNTI) and a Preamble ID.

Other terminals except the first terminal in the group monitor the RAR to the first terminal according to the RA-RNTI and the Preamble ID. If it is detected that the first terminal receives the RAR, other terminals except the first terminal in the group obtain from the RAR a temporary cell radio network temporary identifier (T-CRNTI) and RRC connection UL resources allocated by the network.

404. After the successful network access of the first terminal is detected, initiating, by other terminals except the first terminal in the group, network accesses using the RRC connection UL resources allocated to the group by the network.

Because a MTC terminal is usually used in scenarios with low mobility, or even stationary scenarios (such as, electricity meter, water meter, or the like), which have very slow channel time variances, during a long period of time (such as, during a predetermined period of time), the time delay of a signal that reaches a BS is constant, that is, the Timing Advance is constant. Each device may store the TA value of its previous access, and perform UL transmission time adjustment accordingly. For example, when other terminals in the group send their RRC requests, the UL transmission time is adjusted according to the previously stored TA value.

For example, after the first terminal receives the RAR, a time delay of reaching the BS from the first terminal may be calculated according a preamble arrival time, and the time the first terminal's UL signal reaches the BS may be adjusted according to the TA value, so that synchronize with BS DL frames, and then a RRC access request may be sent using the T-CRNTI and the RRC connection UL resources allocated by the network.

After the successful network access of the first terminal is detected, if it is intercepted by other terminals except the first terminal in the group that the network has allocated RRC connection UL resources to all terminals in the group, they initiate network access using the RRC connection UL resources.

For example, after the establishment of the first terminal's RRC connection, the communication network element queries a group database according to the first terminal's ID, where the group database comprises at least one of group IDs, group amount, member IDs of a group, etc. The communication network element acquires member amount of a group, allocates corresponding resources, for example, allocates group based signaling radio bearer (SRB) and group based dedicated radio bearer (DRB), and sends a RRC connection reconfiguration message to other terminals except the first terminal in the group. Other terminals except the first terminal in the group set a monitoring window to monitor the RRC connection reconfiguration message. Once the message is intercepted, the successful access of the first terminal may be confirmed. Then, other terminals except the first terminal in the group may initiate network access using the RRC connection UL resources. For example, other terminals except the first terminal in the group may initiate a RRC connection procedure in sequence on the same UL resources according to their order in the group, or they may initiate a RRC connection procedure on corresponding respective UL resources simultaneously, or in other manners. If the RRC connection reconfiguration message is not intercepted by other terminals except the first terminal in the group, they may initiate random access separately.

It can be seen from the above description, in this embodiment, terminals are divided into groups; when a first terminal of a group initiate network access, other terminals monitor the access of the first terminal; when the successful access of the first terminal is detected, other terminals initiate network accesses using UL access resources allocated for the group by the network, where all terminals may obtain the same or different UL access resources. Therefore, cooperative communication between terminals in the group is not required, and the group based terminal random access can be achieved without increasing additional random access resources; device complexity and group setup delay can be reduced; the number of random access requests is linearly reduced, so that conflict probability is significantly lowered. Meanwhile, terminal access delay is reduced, power overheads of terminals and the BSs can be saved, and system access capability can be improved. Except for the first terminal, other terminals in the group only need to receive but not to send, and thus terminal power overheads can be reduced.

Figure 5:
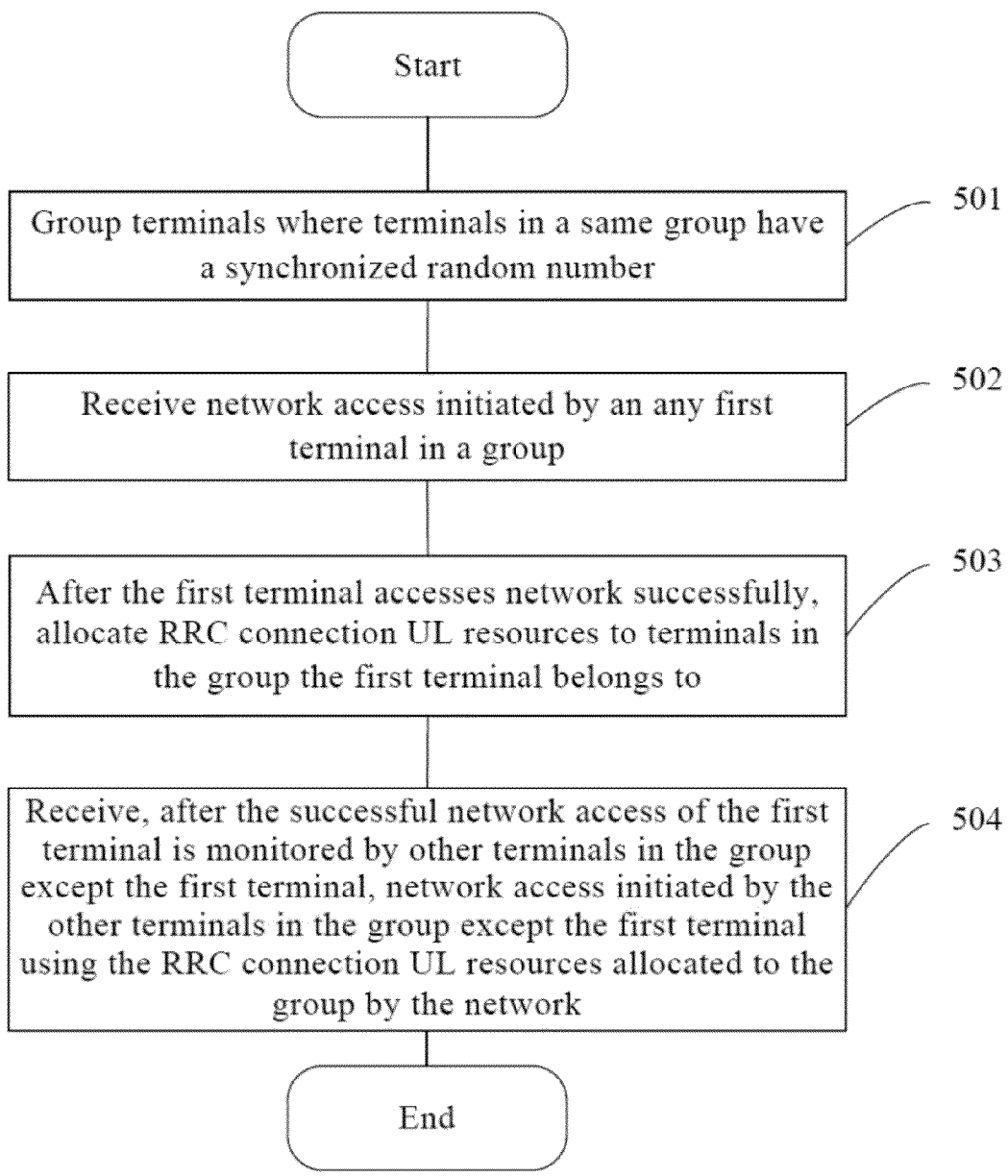
FIG. 5 is a schematic flowchart of a network access method according to another embodiment of the invention.

Referring to FIG. 5, there is shown a schematic flowchart of a network access method according to another embodiment of the invention. The method is mainly as follows.

501. Grouping terminals, where terminals in the same group have a synchronized random number.

For example, after terminals are divided into groups, a communication network element broadcasts group information, including terminal IDs of all terminals of each group, to enable each terminal to calculate a group ID of a group it belongs to according to terminal IDs of all terminals in the group.

In another embodiment of the invention, the communication network element broadcasts group information, including group IDs of the groups, or group IDs of the groups and terminal IDs of all terminals of each group.

502. Receiving network access initiated by an arbitrary first terminal in a group.

For example, the communication network element may specify a first terminal and send the terminal ID of the first terminal to other terminals except the first terminal in the group the first terminal belongs to. The communication network element may receive a preamble sent from the first terminal; send a RAR to the first terminal; receive RRC connection request information, a location update request or a schedule request sent from the first terminal on allocated RRC connection UL resources, where the RRC connection request information, the location update request or the schedule request may carry the terminal ID of the first terminal, the group ID of the group the first terminal belongs to or the synchronized random number; send an ACK to the first terminal, where the ACK may carry the terminal ID of the first terminal, the group ID of the group the first terminal belongs to or the synchronized random number; receive a RRC connection established message returned from the first terminal.

503. After the successful network access of the first terminal, allocating RRC connection UL resources to terminals in the group the first terminal belongs to.

For example, the first terminal initiates random access. When it is detected by other terminals except the first terminal in the group that the first terminal has received the RAR, the other terminals may acquire a T-CRNTI and RRC connection UL resources from the RAR.

The first terminal initiates RRC connection access using its allocated T-CRNTI and RRC connection UL resources.

After the successful RRC connection access of the first terminal, the communication network element sends to all terminals in the group the T-CRNTI and RRC connection UL resources that are allocated to all terminals in the group. For example, the communication network element sends RRC connection reconfiguration or broadcast signaling, in which the RRC connection UL resources are carried, to all terminals in the group.

504. Receiving, after monitoring that the first terminal accesses network successfully by the other terminals except the first terminal in the group, network accesses initiated by the other terminals except the first terminal in the group using the RRC connection UL resources allocated to the group by the network.

After the successful RRC connection network access of the first terminal, the communication network element sends to all terminals or other terminals except the first terminal in the group the T-CRNTI and RRC connection UL resources that are allocated to all terminals in the group, so that other terminals except the first terminal in the group can initiate network accesses using the T-CRNTI and RRC connection UL resources. For example, other terminals except the first terminal in the group may initiate a RRC connection procedure in sequence on the same UL resources according to their order in the group, or terminals can initiate a RRC connection procedure on respective corresponding UL resources simultaneously, or in other manners. If the RRC connection reconfiguration message is not intercepted by other terminals except the first terminal in the group, the other terminals may initiate random access separately.

It can be seen from the above description, in this embodiment, terminals are divided into groups; when a first terminal in a group initiates network access, other terminals in the group monitor the access of the first terminal; after the successful access of the first terminal is detected, other terminals may initiate network access using UL access resources allocated to the group by the network. Therefore, cooperative communication between terminals in the group is not required, device complexity and group setup delay can be reduced, and the number of random access requests is linearly reduced depending on the number of terminals in the group so that conflict probability is significantly lowered. Meanwhile, terminal access delay is reduced and system resource overheads are lowered. Except for the first terminal, other terminals in the group only need to receive but not to send, and thus terminal power overheads can be reduced.

Figure 6:
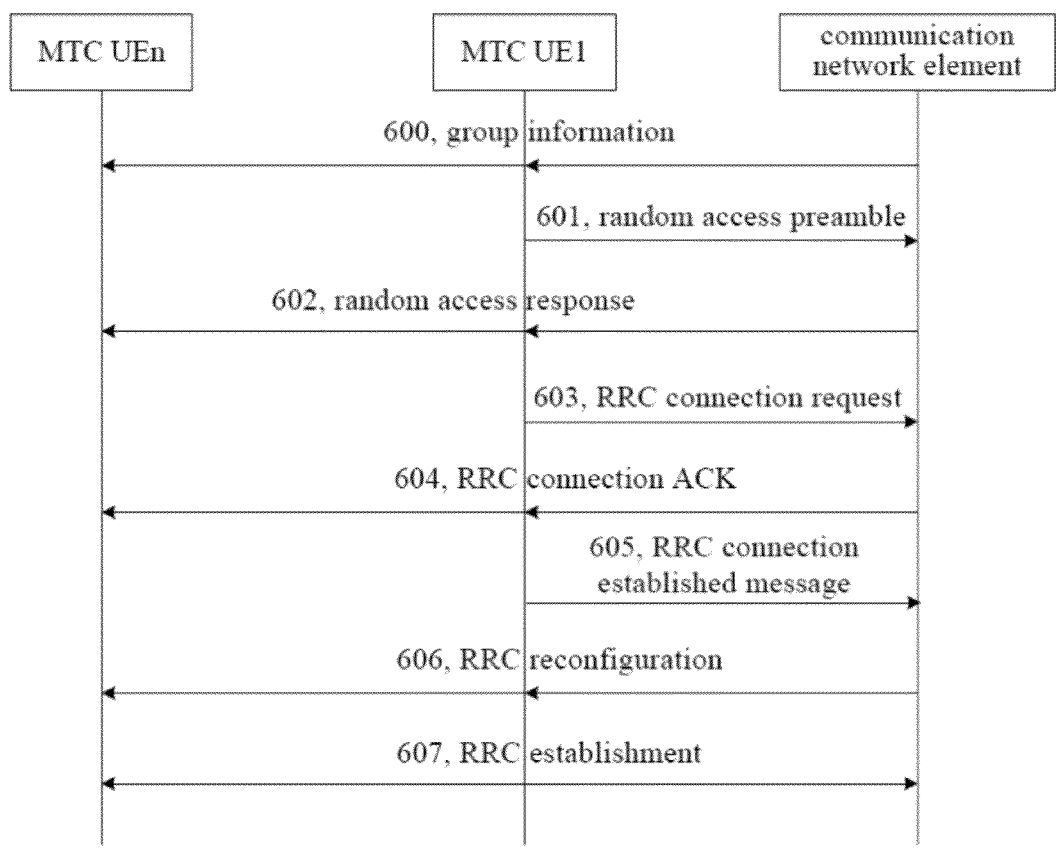
FIG. 6 is a schematic flowchart of a network access method according to another embodiment of the invention.

FIG. 6 is a schematic flowchart of a network access method according to another embodiment of the invention, showing contention based random access that is mainly as follows.

600. Sending, by a communication network element, group information to all terminals in a group.

The communication network element may be a device in the AN, or a device in the CN, or a device separately provided. For example, the communication network element may be a NodeB or RNC in an AN of a WCDMA network. Alternatively, the communication network element may be an eNodeB/MME/access gateway of a LTE system. Also, the communication network element may be a BTS (Base Transceiver Station) or BSC (Base Station controller) in a GSM/CDMS system.

For the convenience of description, this embodiment will be described below with the LTE system as an example. However, other communication systems are also applicable.

For example, the communication network element may divide a plurality of terminals into one or more groups. The specific grouping process may be the same as described in the above embodiments, which will not be described in detail herein.

After dividing terminals into one or more groups, the communication network element broadcasts group information including terminal IDs of all terminals in each group, so that each terminal can calculate a group ID of the group it belongs to according to terminal IDs of all terminals in the group.

In another embodiment of the invention, the communication network element broadcasts group information including group IDs of the groups or including group IDs of the groups and terminal IDs of all terminals in each group.

The communication network element may store the group information.

In another embodiment of the invention, each terminal may store group information of the group it belongs to, including terminal IDs of all terminals belonging to the group, or including the group ID of the group, or including the group ID of the group and terminal IDs of all terminals belonging to the group.

601. Sending, by MTC UE1, a random access preamble to prepare for network access.

Terminals in the same group may perform random number synchronization. For example, terminals in the same group may select the same pseudo random number generator according to the group ID, generate the same pseudo random number seed according the group ID, select the same DL slot position as an input reference time point, and determine random numbers according to the pseudo random number seed and the input reference time point. Because they have the same DL slot position and the same input reference time point, the random numbers are the same also, thereby realizing random number synchronization.

For example, assume there are at least two terminals in a group, such as MTC UE1, MTC UE2, MTC UEn, MTC UEm, where n and m are positive integers larger than or equal to 2. MTC UE1 can be referred to as a first terminal or a group head, MTC UE2, MTC UEm may be called as other terminals except the first terminal in the group. For the convenience of description, other terminals except the first terminal in the group are commonly referred to as MTC UEn. MTC UE1 is an arbitrary terminal in the group, for example, a terminal that requests network access firstly. MTC UE1 can be determined according to the pseudo random number generator, or it can be specified by the network, or it can be determined according to a predetermined setting.

MTC UEn may calculate random access resources to be used according to the synchronized random number, including a RT-RNTI and a preamble ID.

MTC UE1 may send a random access preamble to an eNodeB.

602. Sending, by the communication network element, a RAR to MTC UE1.

After receiving the preamble sent from the first terminal, the communication network element may allocate a T-CRNTI and RRC connection UL resources and send a RAR to the first terminal. The RAR may comprise at least one of TA (Timing Advance), T-CRNTI, next stage UL resource allocation (UL GRANT), and a preamble ID.

Because all terminals in the group have the same random number, all of other terminals in the group except the first terminal can monitor the RAR to the first terminal. For example, MTC UEn monitors the RAR to the first terminal according to the RA-RNTI and the preamble ID. When it is detected through monitoring that the first terminal has received the RAR, other terminals in the group except the first terminal may acquire the T-CRNTI and RRC connection UL resources allocated by the network from the RAR.

In the case that the first terminal is randomly selected in the group, because the random number is the same in the group, MTC UEn may be aware of the terminal ID of MTC UE1.

If a MTC UE receives a back-off instruction, it withdraws for a period of time and then reinitiates random access according to this group based manner or a separate manner; if a MTC UE does not receive the RAR, it initiates random access separately.

603. Sending, by MTC UE1, a RRC connection request to the communication network element.

MTC UE1 may send a RRC connection request according to the T-CRNTI and RRC connection UL resources allocated by the communication network element.

This embodiment will be described with RRC connection as an example. In another embodiment, after receiving a RAR sent from the communication network element, MTC UE1 may send a location update request or a schedule request on the allocated RRC connection UL resources.

The RRC connection request or the location update request or the schedule request may carry the terminal ID of MTC UE1 or the group ID of the group MTC UE1 belongs to or the synchronized random number.

For example, after receiving the RAR, MTC UE1 may calculate a time delay of reaching the BS from the MTC UE1 according a preamble arrival time, and adjust the time MTC UE1 UL signal reaches the BS by using of TA (Timing Advance) so that synchronize with BS DL frames, and then send a RRC access request using the T-CRNTI and the RRC connection UL resources allocated by the communication network element.

604. Returning an ACK from the communication network element.

For example, the communication network element returns an ACK to MTC UE1, for example, a RRC Connection ACK. The ACK may comprise the terminal ID of MTC UE1 or the group ID of the group MTC UE1 belongs to or the synchronized random number.

Other terminals except MTC UE1 in the group monitor the ACK. For example, they may monitor whether the terminal ID carried by the ACK is consistent with the terminal ID of MTC UE1, whether the group ID carried by the ACK is consistent with the group ID of the group MTC UE1 belongs to, or whether the random number carried by the ACK is consistent with the random number of the group MTC UE1 belongs to. In another embodiment of the invention, other terminals except MTC UE1 in the group may set a maximum monitoring window. If the ACK sent from the communication network element is still not detected by other terminals except MTC UE1 in the group when the maximum monitoring window is exceeded, the other terminals may initiate random accesses separately.

605-606. Returning a RRC connection established message from MTC UE1 to the communication network element, and sending, by the communication network element, a RRC connection reconfiguration message.

The communication network element receives the RRC connection established message returned from MTC UE1, and queries a group database according to the terminal ID of MTC UE1, where the group database may comprise at least one of group IDs, group amount, member IDs of a group, etc. The communication network element acquires the group member amount, allocates corresponding resources, for example, group based signaling radio bearers (SRB) and group based dedicated radio bearers (DRB), and sends a RRC connection reconfiguration message to other terminals except MTC UE1 in the group. Other terminals except MTC UE1 in the group may set a monitoring window to monitor the RRC connection reconfiguration message. When the RRC connection reconfiguration message is detected through monitoring, the successful access of MTC UE1 is confirmed. Then, other terminals except MTC UE1 in the group may initiate network access using the RRC connection UL resources. For example, other terminals except MTC UE1 in the group may initiate their RRC connection requests in sequence on the same UL resources according to their order in the group, or terminals may initiate RRC connection requests on respective corresponding UL resources simultaneously, or in other manners. If the RRC connection reconfiguration message is not detected by other terminals except MTC UE1 in the group through monitoring, they may initiate random access separately.

607. Initiating, by other terminals except MTC UE1 in the group, RRC access.

Other terminals except MTC UE1 in the group may initiate network access using the RRC connection UL resources allocated by the communication network element. For example, other terminals except MTC UE1 in the group may initiate their RRC connection requests in sequence on the same UL resources according to their order in the group, or terminals may initiate RRC connection requests on respective corresponding UL resources simultaneously, or in other manners. If the RRC connection reconfiguration message is not detected by other terminals except MTC UE1 in the group through monitoring, they may initiate random access separately.

It can be seen from the above description, in this embodiment, terminals may be divided into one or more groups;

when a first terminal in a group initiates network access, other terminals may monitor the access of the first terminal; when the successful access of the first terminal is detected through monitoring, other terminals may initiate network access using UL access resources allocated to the group by the network; therefore, cooperative communication between terminals in the group is not required, device complexity and group setup delay can be reduced, and the number of random access requests is linearly reduced depending on the number of terminals in the group, so that conflict probability is significantly lowered. Meanwhile, terminal access delay is reduced and system resource overheads are lowered. Except for the first terminal, other terminals in the group only need to receive but not to send, and thus terminal power overheads can be reduced.

Figure 7:
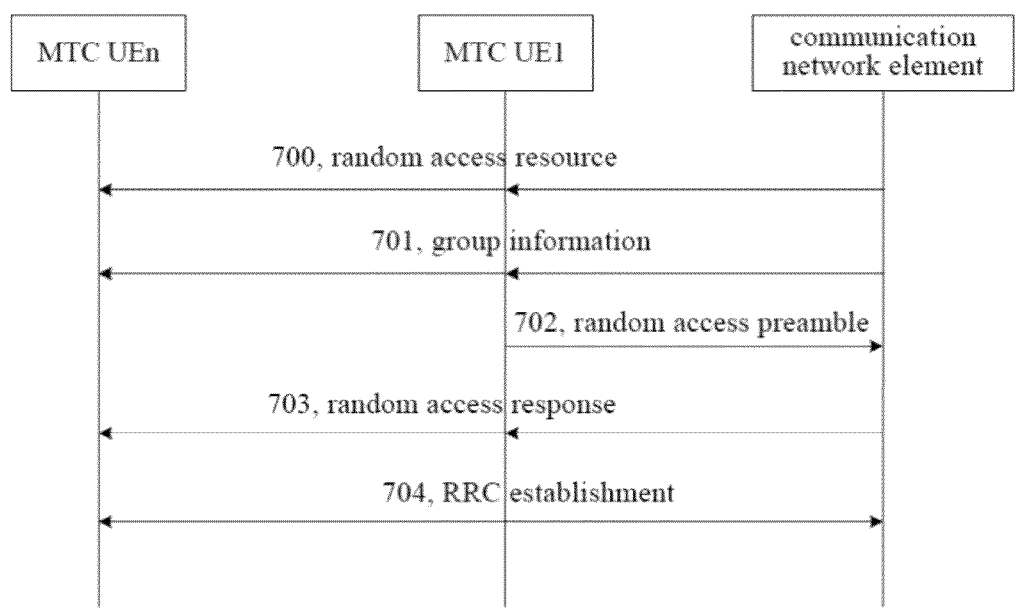
FIG. 7 is a schematic flowchart of a network access method according to another embodiment of the invention.

FIG. 7 is a schematic flowchart of a network access method according to another embodiment of the invention, showing non-contention based random access, which is mainly as follows.

700. A communication network element sends specified random access resources to all terminals in a group.

The random access resources may comprise a RA-PNTI and a preamble ID, or only a preamble ID.

In this embodiment, the communication network element may be an eNodeB in the LTE system.

701. The communication network element sends group information to all terminals in the group.

For example, the communication network element divides terminals into one or more groups and broadcasts group information thereafter, including terminal IDs of all terminals in the group, so that each terminal can calculate a group ID of the group it belongs to according to terminal IDs of all terminals in the group.

In another embodiment of the invention, the communication network element may broadcast group information including group IDs of the groups or including group IDs of the groups and terminal IDs of all terminals in each group.

The communication network element may stores the group information.

In another embodiment of the invention, each terminal stores group information of a group it belongs to, including terminal IDs of all terminals in the group, or including the group ID of the group, or including the group ID of the group and terminal IDs of all terminals in the group.

This embodiment does not have limitation on the sequence of 700 and 701, which can be executed concurrently or 700 can be executed before 701, and vice versa.

702. MTC UE1 sends a random access preamble to prepare for network access.

Terminals in the same group perform random number synchronization. For example, terminals in the same group may select the same pseudo random number generator according to the group ID and produce the same pseudo random number seed according the group ID; select the same DL slot position as an input reference time point; and determine random numbers according to the pseudo random number seed and the input reference time point. Because they have the same DL slot position and the same input reference time point, the random numbers are the same also, thereby realizing random number synchronization.

MTC UE1 may send a random access preamble to an eNodeB using specified random access resources.

703. The communication network element sends a RAR to MTC UE1.

After receiving the preamble sent from the first terminal, the communication network element allocates a T-CRNTI and allocates RRC connection UL resources according to the group information, and sends a RAR to the first terminal. The RAR may comprise at least one of TA (Timing Advance), T-CRNTI, next stage UL resource allocation (UL GRANT), and a preamble ID.

Because all terminals in the group have the same random number and the random access resources as in 700, all of other terminals in the group except the first terminal can monitor the RAR to MTC UE1. For example, MTC UEn monitors the RAR to MTC UE1 according to the RA-RNTI and the preamble ID. When it is determined by monitoring that MTC UE1 has received the RAR, other terminals in the group except the first terminal acquire the T-CRNTI and RRC connection UL resources allocated by the network from the RAR.

In the case that the first terminal is randomly selected in a group, because the random number is the same in the group, MTC UEn may be aware of the terminal ID of MTC UE1.

When a MTC UE receives a back-off instruction, it withdraws for a period of time and then reinitiates random access in a group based manner or separately; if a MTC UE does not receive the RAR, it may initiate random access separately.

704. Other terminals except MTC UE1 in the group MTC UE1 belongs to initiate RRC access.

Other terminals except MTC UE1 in the group MTC UE1 belongs to may initiate network access using the RRC connection UL resources allocated by the communication network element. For example, other terminals except MTC UE1 in the group may initiate RRC connection according to the random access resources allocated to all terminals in the group by the communication network element. For example, terminals in the group may perform the RRC connection procedure in sequence on the same UL resources, or terminals may perform the RRC connection procedure on respective corresponding UL resources simultaneously, or other manners may be employed. If the RAR is not intercepted by other terminals except MTC UE1 in the group, the other terminals may initiate random access separately.

It can be seen from the above description, in this embodiment, terminals are divided into one or more groups; when a first terminal in a group initiates network access, other terminals monitor the access of the first terminal; when the successful access of the first terminal is detected through monitoring, other terminals initiate network access using UL access resources allocated to the group by the network. Therefore, cooperative communication between terminals in the group is not required, device complexity and group setup delay can be reduced, and the number of random access requests is linearly reduced with the number of terminals in the group, so that conflict probability is significantly lowered. Meanwhile, terminal access delay is reduced and system resource overheads are lowered. Except for the first terminal, other terminals in the group only need to receive but not to send, and thus terminal power overheads can be reduced.

Figure 8:
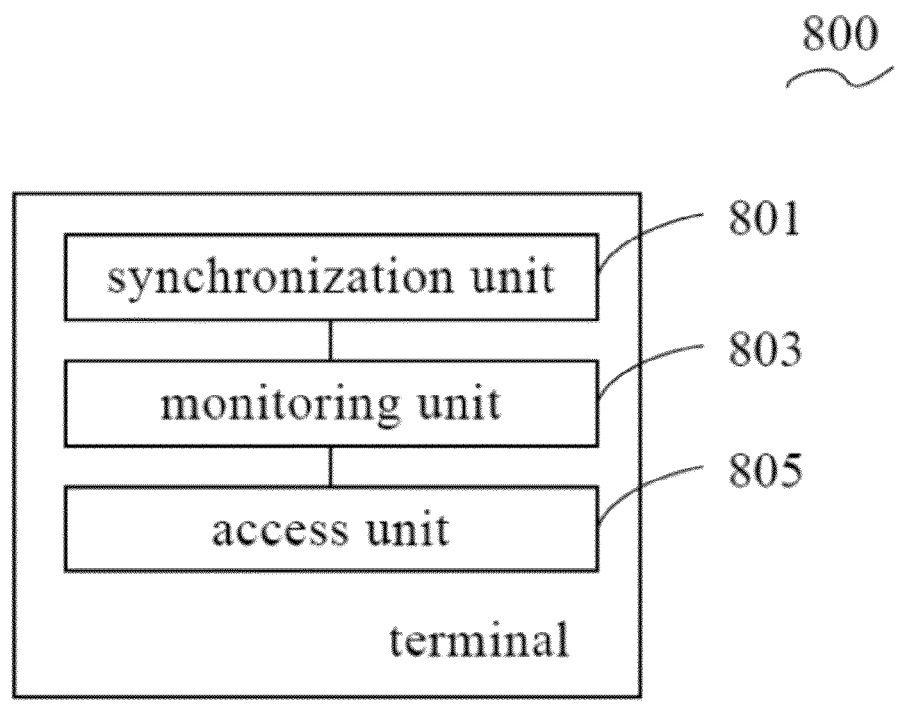
FIG. 8 is a schematic structure diagram of a terminal 800 according to another embodiment of the invention.

FIG. 8 is a schematic structure diagram of a terminal 800 according to another embodiment of the invention. The terminal 800 may be a mobile terminal or a fixed terminal or a MTC terminal. MTC terminals refer to terminals employing M2M communication, and may be terminals used in intelligent transportation, telemedicine, monitoring, smart grids, environment detecting, intelligent home and other scenarios. The terminal 800 may belong to the same group with at least one another terminal; the particular grouping process may be as described above. The terminal 800 may comprise a synchronization unit 801, a monitoring unit 803 and an access unit 805.

The synchronization unit 801 is configured to perform random number synchronization on terminals belonging to the same group.

The monitoring unit 803 is configured to monitor network access of an arbitrary first terminal in the group according to the synchronized random number when the first terminal initiates the access.

The access unit 805 is configured to, after monitoring that the first terminal accesses network successfully through monitoring, perform network access using RRC connection UL resources allocated to the group by the network.

For example, when the monitoring unit 803 detects the successful network access of the first terminal through monitoring, if it is intercepted that the network has allocated RRC connection UL resources to all terminals belonging to the group, the access unit 805 initiate network access using the RRC connection UL resources.

Figure 9:
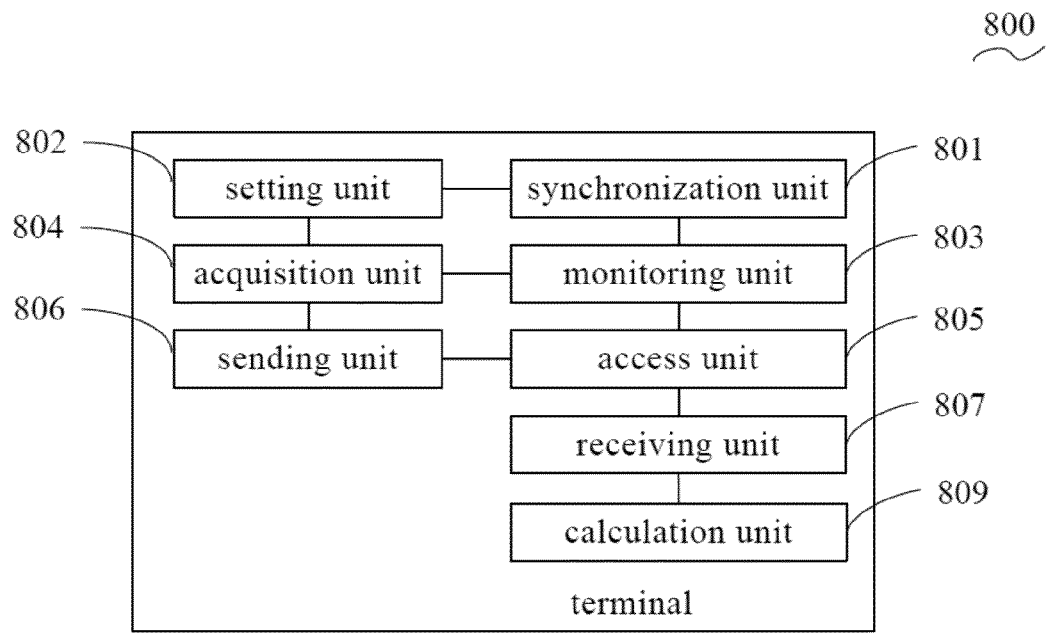
FIG. 9 is another schematic structure diagram of the terminal 800 according to another embodiment of the invention.

FIG. 9 is another schematic structure diagram of the terminal 800 according to another embodiment of the invention, wherein the terminal 800 further comprises a receiving unit 807 and a calculation unit 809.

The receiving unit 807 is configured to receive group information broadcast by the network, where the group information may comprise terminal IDs of all terminals in each group.

The calculation unit 809 is configured to calculate the group ID of a group according to terminal IDs of all terminals belonging to the group.

In another embodiment of the invention, the calculation unit 809 is configured to calculate random access resources to be used according to the synchronized random number, where the random access resources may comprise a RA-RNTI and a preamble ID, or the random access resources may comprise only a preamble ID.

In another embodiment of the invention, the receiving unit 807 may further be used to receive group information broadcast by the network, where the group information may comprise group IDs of the groups, or the group information may comprise group IDs of the groups and terminal IDs of all terminals in each group.

In another embodiment of the invention, the terminal 800 may further comprise a setting unit 802 for presetting a group ID of a group the terminal belongs to.

In another embodiment of the invention, the synchronization unit 801 may further comprise a generation subunit, a selection subunit and a determination subunit.

The generation subunit is configured to select a same pseudo random number generator according to the group ID, and generate a same pseudo random number seed according to the group ID.

The selection subunit is configured to select a same DL slot position as an input reference time point.

The determination subunit is configured to determine a random number according to the pseudo random number seed and the input reference time point.

In another embodiment of the invention, the terminal 800 may further comprise an acquisition unit 804. For example, the monitoring unit 803 is configured to monitor whether there is a RAR to the first terminal and whether there is message about the successful RRC connection of the first terminal. After the RAR to the first terminal or the successful RRC connection of the for example is intercepted by the monitoring unit, the acquisition unit 804 acquires a temporary cell radio network temporary identifier (T-CRNTI) and RRC connection UL resources allocated by the network.

For example, the monitoring unit 803 is configured to monitor the RAR to the first terminal according to the RA-RNTI and the preamble ID. When the RAR to the first terminal is intercepted by the monitoring unit 803, the acquisition unit 804 is configured to acquire from the RAR a T-CRNTI and RRC connection UL resources allocated by the network.

In another embodiment of the invention, if the terminal 800 is the first terminal, it may further comprise a sending unit 806 for sending a preamble to the network.

After the RAR sent from the network is received by the receiving unit 807, the sending unit 806 is further used to send RRC connection request, a location update request or a schedule request on the allocated RRC connection UL resources, where the RRC connection request, the location update request or the schedule request carries the terminal ID of the first terminal or the group ID of the group the first terminal belongs to or the synchronized random number.

The receiving unit 807 is configured to receive an ACK sent from the network, where the ACK carries the terminal ID of the first terminal or the group ID of the group the first terminal belongs to or the synchronized random number.

After the ACK is received by the receiving unit 807, the sending unit 806 is configured to send a RRC connection established message to the network.

In another embodiment of the invention, the access unit 805 may initiate RRC connection according to random or specified UL access resources sent to all terminals in the group by the communication network element. For example, the access unit 805 may perform RRC connection according to the same UL resources in sequence, or perform RRC connection on corresponding UL resources of respective terminals simultaneously, or perform RRC connection in other manners. If the RAR is not intercepted by the monitoring unit 803, the access unit 805 may initiate random access separately.

Functions of the terminal 800 and units contained in the terminal 800 described above are merely illustrative, and the specific description of the above method embodiments can be referred to for the detailed functions and working flows, which will not be described in detail herein.

Figure 10:
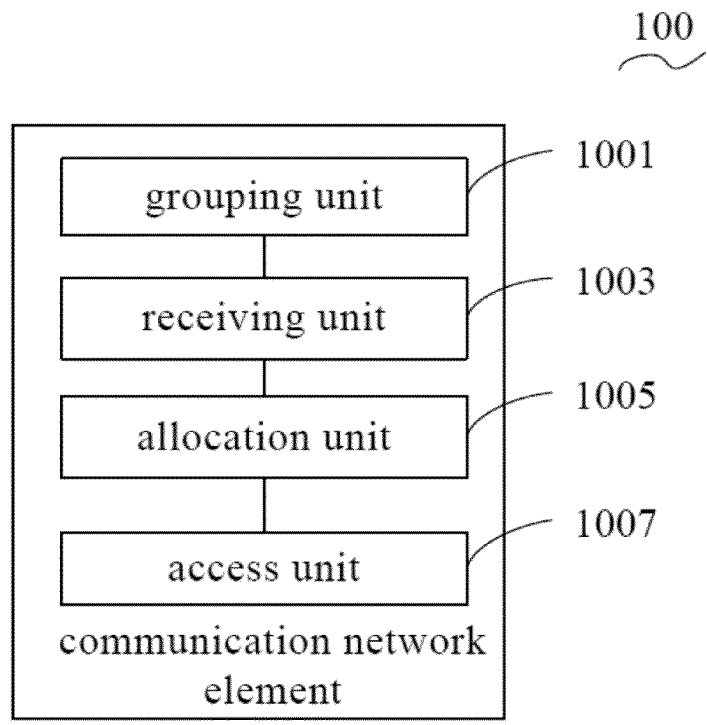
FIG. 10 is a schematic structure diagram of a communication NE 100 according to another embodiment of the invention.

FIG. 10 is a schematic structure diagram of a communication NE 100 according to another embodiment of the invention. The communication network element 100 may be a device in the AN, a device in the CN, or a separately provided device. For example, the communication network element 100 may be a NodeB or RNC in a AN of a WCDMA network. Alternatively, the communication network element 100 may be a eNodeB/MME/access gateway of a LTE system. Also, the communication network element 100 may be a BTS or BSC in a GSM/CDMS system.

The communication NE 100 may comprise a grouping unit 1001, a receiving unit 1003, an allocation unit 1005, and an access unit 1007.

The grouping unit 1001 is configured to divide terminals into one or more groups, where terminals belonging to the same group have a synchronized random number.

The receiving unit 1003 is configured to receive network access initiated by an arbitrary first terminal in a group.

The allocation unit 1005 is configured to, after the first terminal accesses successfully the network, allocate RRC connection UL resources to terminals of the group the first terminal belongs to.

The access unit 1007 is configured to receive network access initiated by other terminals except the first terminal in the group using the RRC connection UL resources allocated to the group by the network after monitoring that the first terminal accesses network successfully.

Figure 11:
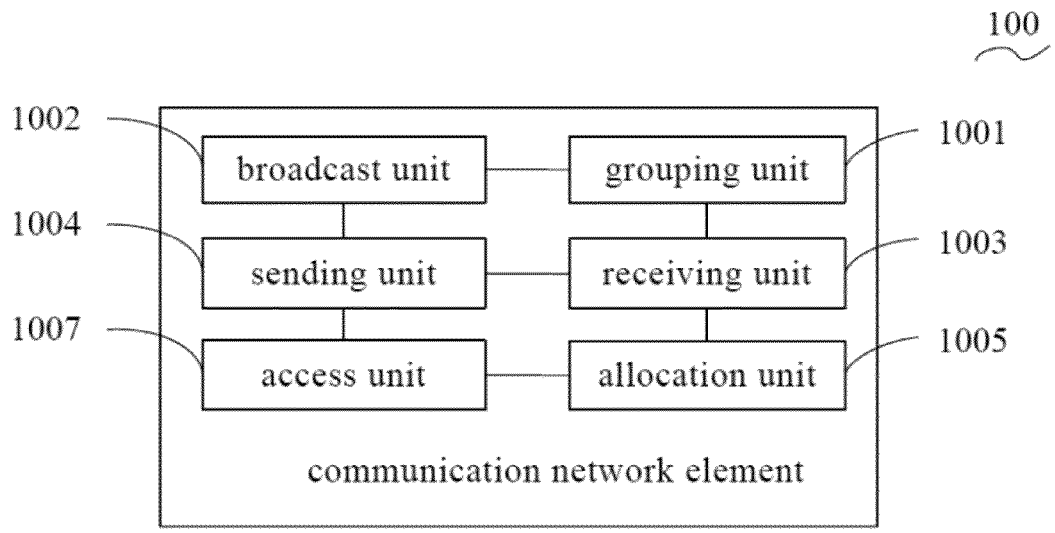
FIG. 11 is another schematic structure diagram of the communication NE 100 according to another embodiment of the invention.

FIG. 11 is another schematic structure diagram of the communication NE 100 according to another embodiment of the invention. As shown, the communication NE 100 may further comprise: a broadcast unit 1002 for broadcasting group information, where the group information may comprise terminal IDs of all terminals in each group, such that each terminal can calculate a group ID of a group it belongs to according to terminal IDs of all terminals in the group.

In another embodiment of the invention, the broadcast unit 1002 is configured to broadcast group information including group IDs of the groups or including group IDs of the groups and terminal IDs of all terminals in each group.

For example, the receiving unit 1003 is configured to receive a preamble sent from the first terminal; receive RRC connection request, a location update request or a schedule request sent from the first terminal on the allocated RRC connection UL resources, where the RRC connection request, the location update request or the schedule request carries the terminal ID of the first terminal, the group ID of the group the first terminal belongs to or the synchronized random number; and receive a RRC connection established message returned from the first terminal. In another embodiment of the invention, the communication network element 100 may further comprise a sending unit 1004 for, after the preamble sent from the first terminal is received, sending a RAR to the first terminal; after the RRC connection request, the location update request or the schedule request sent from the first terminal is received, sending an ACK to the first terminal, where the ACK carries the terminal ID of the first terminal, the group ID of the group the first terminal belongs to or the synchronized random number.

In another embodiment of the invention, the receiving unit 1003 is configured to receive the preamble sent from the first terminal; the sending unit 1004 is configured to send a RAR to the first terminal. The receiving unit 1003 is configured to receive the RRC connection request, the location update request or the schedule request sent from the first terminal on the allocated RRC connection UL resources, where the RRC connection request, the location update request or the schedule request carries the terminal ID of the first terminal, the group ID of the group the first terminal belongs to or the synchronized random number. The sending unit 1004 is configured to send an ACK to the first terminal, where the ACK carries the terminal ID of the first terminal, the group ID of the group the first terminal belongs to or the synchronized random number. The receiving unit 1003 is configured to receive a RRC connection established message returned from the first terminal. The RAR carries a temporary cell radio network temporary identifier (T-CRNTI) and RRC connection UL resources.

In another embodiment of the invention, after the first terminal accesses successfully the network, the sending unit 1004 is configured to send RRC connection UL resources allocated to all terminals in the group to all terminals in the group, so that other terminals in the group except the first terminal can initiate network access using the RRC connection UL resources.

In another embodiment of the invention, the allocation unit 1005 is configured to assign random access resources to all terminals in the group. The sending unit 1004 is configured to send the specified random access resources to all terminals in the group.

Functions of the terminal 100 and units contained in the terminal 100 described above are merely illustrative, and the specific description of the above method embodiments can be referred to for the detailed functions and working flows, which will not be described in detail herein.

In another embodiment of the invention, a communication system may comprise the terminal 800 and the communication network element 100 as described above.

The terminal 800 is configured to execute random number synchronization with terminals belonging to a same group and monitor access of an arbitrary first terminal in the group according to the synchronized random number when the first terminal initiates network access. After the successful network access of the first terminal is detected by a monitoring unit, the terminal 800 executes network access using RRC connection UL resources allocated to the group by the network.

The communication NE 100 is configured to divide terminals into one or more groups, where terminals belonging to a same group have a synchronized random number; receive network access initiated by an arbitrary first terminal in a group; after the first terminal accesses successfully the network, allocate RRC connection UL resources to the group the first terminal belongs to; receive network access initiated by other terminals except the first terminal in the group using the RRC connection UL resources allocated to the group after monitoring that the first terminal accesses network successfully.

The specific description of the above method embodiments can be referred to for detailed functions and working flows of the terminal 800 and the communication network element 100 described above, which will not be described in detail herein.

It can be easily understood by persons skilled in the art that, for the purpose of convenient and brief description, a specific working process of the foregoing system, device and unit will not be described in detail herein, which may refer to the corresponding process in the forgoing method embodiments.

It should be understood that, in several embodiments provided in the present application, the disclosed system, device, and method may be implemented in various ways. For example, the described device embodiments are merely exemplary. For example, the unit division is merely logical function division and can be other divisions in actual implementation. For example, a plurality of units or components can be combined or integrated into another system, or some features can be ignored or not performed. Furthermore, the shown or discussed coupling or direct coupling or communication connection may be accomplished through indirect coupling or communication connection by some interfaces, devices or units and may be in an electrical form, a mechanical form, or in other forms.

Units described as separate components may be or may not be physically separated. Components shown as units may be or may not be physical units, that is, may be integrated or distributed to multiple network units. Some or all of the units may be selected to achieve the objective of the solution of the embodiment according to actual requirements.

In addition, various functional units according to each embodiment of the present invention may be integrated in one processing module or may exist as separate physical units, or two or more units may also be integrated in one unit. The integrated module may be implemented through hardware, or may also be implemented in a form of a software functional module.

When the integrated module is implemented in the form of the software functional module and sold or used as a separate product, the integrated module may be stored in a computer readable storage medium. Therefore, the technical solution of the present invention or the part that makes contributions to the prior art can be substantially embodied in the form of a software product. The computer software product is stored in a storage medium, and contains several instructions to instruct computer equipment (such as, a personal computer, a server, or network equipment) to perform all or part of steps of the method as described in the embodiments of the present invention. The storage medium includes various media capable of storing program codes, such as, a flash disk, a mobile hard disk, a Read-Only Memory (ROM), a Random Access Memory (RAM), a magnetic disk or an optical disk.

The above are merely exemplary embodiments of the present invention, but the protection scope of the present invention is not limited herein. Any change or replacement that can be easily figured out by persons skilled in the art within the technical scope disclosed by the present invention shall be covered by the protection scope of the present invention. Therefore, the protection scope of the present invention shall be defined by the claims.

What is claimed is:

1. A method for accessing a network, comprising:
    performing, by terminals belonging to a same group, random number synchronization;
    when an arbitrary first terminal in the group initiates a first network access, monitoring the first network access of the first terminal by other terminals in the group, except the first terminal, according to a synchronized random number;
    after monitoring that the first terminal accesses a network successfully, initiating a second network access by the other terminals in the group, except the first terminal, using radio resource control (RRC) connection uplink (UL) resources allocated to the group by the network,
    wherein the performing, by the terminals belonging to the same group, the random number synchronization comprises:
    selecting a same pseudo random number generator according to a group ID and generating a same pseudo random number seed according to the group ID by the terminals in the same group;
    selecting, by the terminals in the same group, a same downlink (DL) slot position as an input reference time point; and
    determining, by the terminals in the same group, a random number according to the pseudo random number seed and the input reference time point.

2. The method according to claim 1, further comprising at least one of the group consisting of:
    (a) receiving group information broadcast by the network, wherein the group information comprises terminal IDs of all the terminals in the group, and calculating, by each terminal, a group ID of the group which the terminal belongs to according to the terminal IDs of all the terminals in the group;
    (b) receiving group information broadcast by the network, wherein the group information comprises one of the group consisting of (i) the group ID of the group, (ii) the group ID of the group and terminal IDs of all the terminals in the group; and
    (c) providing each terminal with a preset group ID of the group that the terminal belongs to.

3. The method according to claim 1, wherein,
    the first terminal is determined according to one of the group consisting of: (a) the pseudo random number generator, (b) the network, and (c) a predetermined setting.

4. The method according to claim 1, further comprising:
    calculating random access resources to be used according to the synchronized random number by the other terminals in the group, except the first terminal,
    wherein the random access resources comprise one of the group consisting of (a) a random access radio network temporary identifier (RA-RNTI) and a preamble ID, and (b) a preamble ID.

5. The method according to claim 4, further comprising:
    monitoring a random access response (RAR) to the first terminal according to the RA-RNTI and the preamble ID by the other terminals in the group, except the first terminal;
    if it is monitored that the first terminal receives the RAR, acquiring by other terminals in the group, except the first terminal, a temporary cell radio network temporary identifier (T-CRNTI) and the RRC connection UL resources allocated by the network from the RAR.

6. The method according to claim 1, wherein the initiating the first network access by the arbitrary first terminal in the group comprises:
    sending a preamble to the network by the first terminal;
    after receiving a random access response (RAR) sent from the network, sending one of the group consisting of: an RRC connection request, a location update request and a schedule request on the allocated RRC connection UL resources by the first terminal, wherein the one of the group consisting of: the RRC connection request, the location update request and the schedule request carries one of the group consisting of a terminal ID of the first terminal, a group ID of the group that the first terminal belongs to, and the synchronized random number;
    receiving, by the first terminal, an acknowledge (ACK) message sent from the network, wherein the ACK message carries one of the group consisting of: the terminal ID of the first terminal, the group ID of the group that the first terminal belongs to, and the synchronized random number; and
    sending by the first terminal an RRC connection established message to the network.

7. The method according to claim 1, wherein after the result that the first terminal successfully accesses the network is monitored, initiating the second network access by the other terminals in the group, except the first terminal, using the synchronized random number specially comprises:
    after the result that the first terminal successfully accesses the network is monitored, if it is monitored by the other terminals in the group, except the first terminal, that the RRC connection UL resources to all the terminals in the group are allocated by the network, initiating the second network access using the RRC connection UL resources.

8. A method for accessing a network, comprising:
    grouping terminals, wherein terminals belonging to a same group have a synchronized random number;
    receiving a first network access initiated by an arbitrary first terminal in the group;
    after the first terminal successfully accesses the network, allocating radio resource control (RRC) connection uplink (UL) resources to the terminals of the group the first terminal belongs to; and
    receiving a second network access initiated by other terminals in the group, except the first terminal, using the RRC connection UL resources allocated to the group by the network after monitoring that the first terminal accesses network successfully,
    wherein the terminals belonging to the same group establish the synchronized random number by performing a method comprising:
    selecting a same pseudo random number generator according to a group ID and generating a same pseudo random number seed according to the group ID by the terminals in the same group;

selecting, by the terminals in the same group, a same downlink (DL) slot position as an input reference time point and determining, by the terminals in the same group, a random number according to the pseudo random number seed and the input reference time point.

9. The method according to claim 8, further comprising:
broadcasting group information, wherein the group information comprises one of the group consisting of: (a) terminal IDs of all the terminals in the group, so that each terminal calculates a group ID of the group that the terminal belongs to according to the terminal IDs of all the terminals in the group, (b) the group ID of the group, and (c) the group ID of the group and the terminal IDs of all the terminals in the group.

10. The method according to claim 8, wherein the receiving the first network access initiated by the arbitrary first terminal in the group further comprises:
receiving a preamble sent from the first terminal;
sending a random access response (RAR) to the first terminal;
receiving one of the group consisting of: an RRC connection request, a location update request and a schedule request sent from the first terminal on the allocated RRC connection UL resources, wherein the one of the group consisting of the RRC connection request, the location update request and the schedule request carries one of the group consisting of a terminal ID of the first terminal, a group ID of the group that the first terminal belongs to, and the synchronized random number;
sending an acknowledge (ACK) message to the first terminal, wherein the ACK message carries one of the group consisting of the terminal ID of the first terminal, the group ID of the group that the first terminal belongs to, and the synchronized random number; and
receiving an RRC connection established message sent from the first terminal.

11. The method according to claim 10, wherein the RAR carries a temporary cell radio network temporary identifier (T-CRNTI) and the RRC connection UL resources.

12. The method according to claim 8, further comprising:
after the first terminal accesses successfully the network, sending to all the terminals in the group the RRC connection UL resources that are allocated to all the terminals in the group, so that the other terminals in the group, except the first terminal, initiate the second network access using the RRC connection UL resources.

13. The method according to claim 12, wherein the sending to all the terminals in the group the RRC connection UL resources that are allocated to all the terminals in the group further comprises:
sending one of the group consisting of RRC connection reconfiguration information and broadcast signaling to all the terminals in the group, wherein the RRC connection UL resources are carried by the one of the group consisting of: the RRC connection reconfiguration information and broadcast signaling.

14. The method according to claim 8, further comprising:
specifying the first terminal; and
sending the terminal ID of the first terminal to the other terminals in the group that the first terminal belongs to, except the first terminal.

15. A terminal, comprising:
a processor; and
a non-transitory computer readable medium including computer-executable instructions that, when executed by the processor, facilitate:

performing a random number synchronization by the terminal with other terminals belonging to a same group by:
selecting a same pseudo random number generator according to a group ID, and generating a same pseudo random number seed according to the group ID by terminals in a same group;
selecting a same downlink (DL) slot position as an input reference time point; and
determining a random number according to the pseudo random number seed and the input reference time point so as to perform random number synchronization with the terminals belonging to the same group;
monitoring, when an arbitrary first terminal in the group initiates a first network access, the first network access of the first terminal according to a synchronized random number;
accessing, after a result that the first terminal accesses a network successfully is monitored, the network using radio resource control (RRC) connection uplink (UL) resources allocated to the group by the network.

16. The terminal according to claim 15, further comprising computer-executable instructions for:
receiving group information broadcast by the network, wherein the group information comprises terminal IDs of all the terminals in the group;
calculating a group ID of the group according to the terminal IDs of all the terminals in the group.

17. The terminal according to claim 15, further comprising computer exectable instructions for:
receiving group information broadcast by the network, wherein the group information comprises one of the group consisting of: (a) a group ID of the group, and (b) the group ID of the group and terminal IDs of all the terminals in the group.

18. The terminal according to claim 15, wherein, the monitoring includes monitoring whether there is a random access response (RAR) to the first terminal and whether there is a result that the RRC connection of the first terminal is successful; and
the terminal further comprises computer-executable instructions facilitating:
acquiring a temporary cell radio network temporary identifier (T-CRNTI) and the RRC connection UL resources, after the monitoring one of the group consisting of:
(a) the RAR to the first terminal, and
(b) the result that the RRC connection of the first terminal is successful.

19. A communication network element (NE), comprising:
a processor; and
a non-transitory computer-readable medium including computer executable instructions that when executed by the processor, facilitate grouping terminals, wherein terminals belonging to a same group have a synchronized random number, and
wherein the terminals belonging to the same group establish the synchronized random number by performing a method comprising:
selecting a same pseudo random number generator according to a group ID and generating a same pseudo random number seed according to the group ID by the terminals in the same group;
selecting, by the terminals in the same group, a same downlink (DL) slot position as an input reference time point; and determining, by the terminals in the same group, a random number according
to the pseudo random number seed and the input reference time point; and
a receiver configured to receive a first network access initiated by an arbitrary first terminal in the same group;
wherein the processor is further configured to allocate radio resource control (RRC) connection uplink (UL) resources to all the terminals of the group the first terminal belongs to after the first terminal successfully accesses the network; and
the receiver is further configured to receive a second network access initiated by other terminals in the group, except the first terminal, using the RRC connection UL resources allocated to the group by the network after a result that the first terminal accesses successfully network is monitored.

20. The communication network element according to claim 19, further comprising:
a transmitter configured to broadcast group information, wherein the group information comprises terminal IDs of all the terminals in the group, so that each terminal calculates a group ID of the group that the terminal belongs to according to the terminal IDs of all the terminals in the group.

21. The communication network element according to claim 19, further comprising:
a transmitter configured to broadcast group information, wherein the group information comprises one of the group consisting of (a) a group ID of the group, and (b) the group ID of the group and terminal IDs of all the terminals in the group.

22. The communication network element according to claim 19, further comprising: a transmitter; and
wherein, the receiver is configured to:
receive a preamble sent from the first terminal;
receive one of the group consisting of: an RRC connection request, a location update request and a schedule request sent from the first terminal on the allocated RRC connection UL resources, wherein the one of the group consisting of the RRC connection request, the location update request and the schedule request carries one of the group consisting of a terminal ID of the first terminal, a group ID of the group the first terminal belongs to and the synchronized random number; and
receive an RRC connection established message sent from the first terminal;
the transmitter is configured to, after the preamble sent from the first terminal is received:
send a random access response (RAR) to the first terminal;
send an acknowledge (ACK) message to the first terminal, after one of the group consisting of:
the RRC connection request,
the location update request, and
the schedule request sent from the first terminal is received,
wherein the ACK message carries one of the group consisting of the terminal ID of the first terminal, the group ID of the group that the first terminal belongs to, and the synchronized random number.

* * * * *

UNITED STATES PATENT AND TRADEMARK OFFICE
CERTIFICATE OF CORRECTION

PATENT NO. : 9,148,848 B2  Page 1 of 1
APPLICATION NO. : 13/765416
DATED : September 29, 2015
INVENTOR(S) : Li et al.

It is certified that error appears in the above-identified patent and that said Letters Patent is hereby corrected as shown below:

On the title page item 56

Page 2, column 2, line 5, "A J 3GPP TS 25.33" should read -- 3GPP TS 25.331 --.

Signed and Sealed this
Sixteenth Day of February, 2016

Michelle K. Lee
*Director of the United States Patent and Trademark Office*